United States Patent [19]
Ayala Martinez et al.

[11] Patent Number: 5,072,783
[45] Date of Patent: Dec. 17, 1991

[54] EXTRACTION SYSTEM OF GEOTHERMAL ENERGY

[76] Inventors: Guillermo Ayala Martinez; Juan A. de Ferrer Daroca, both of Balluarte, s/n - portal 1 piso 9 J, Algeciras (Cádiz), Spain

[21] Appl. No.: 607,156
[22] Filed: Oct. 31, 1990

[30] Foreign Application Priority Data

Nov. 13, 1989 [ES] Spain ................................ 8903852

[51] Int. Cl.5 ............................................. F24J 3/08
[52] U.S. Cl. ..................................... 165/45; 165/101; 60/641.2
[58] Field of Search ................ 165/45, 101; 60/641.2, 60/641.3, 641.5

[56] References Cited

U.S. PATENT DOCUMENTS 3,957,108 5/1976 Huisen ............................... 60/641.2
4,512,156 4/1985 Nagase ............................... 60/641.2

FOREIGN PATENT DOCUMENTS 268282 5/1989 German Democratic Rep. ... 165/45
586378 8/1977 Switzerland ....................... 60/641.2

OTHER PUBLICATIONS

"Hot Rocks", *MIT Reporter Technology Review*, Aug.-/Sep. 1990, p. 9.

*Primary Examiner*—Albert W. Davis, Jr.
*Attorney, Agent, or Firm*—Darby & Darby

[57] ABSTRACT

A direct transfer of heat is done with the dry hot rock or rock of any other kind working with a thermal fluid in a closed circuit.

By means of sounding pipes (1) provided with internal fluid conducting pipes (3) or graduated lengths introduced in perforations made in the rock, the thermal exchange zones between two specific pipes are sequentially selected, leaving the remaining zones recovering heat from the geothermal deposit. Changing to other zones of the exploitation by means of the combination of the corresponding pipes thus obtains a practically continuous heat extraction process.

The extracted heat is collected in a heat exchanger and/or accumulator tank (7).

6 Claims, 1 Drawing Sheet

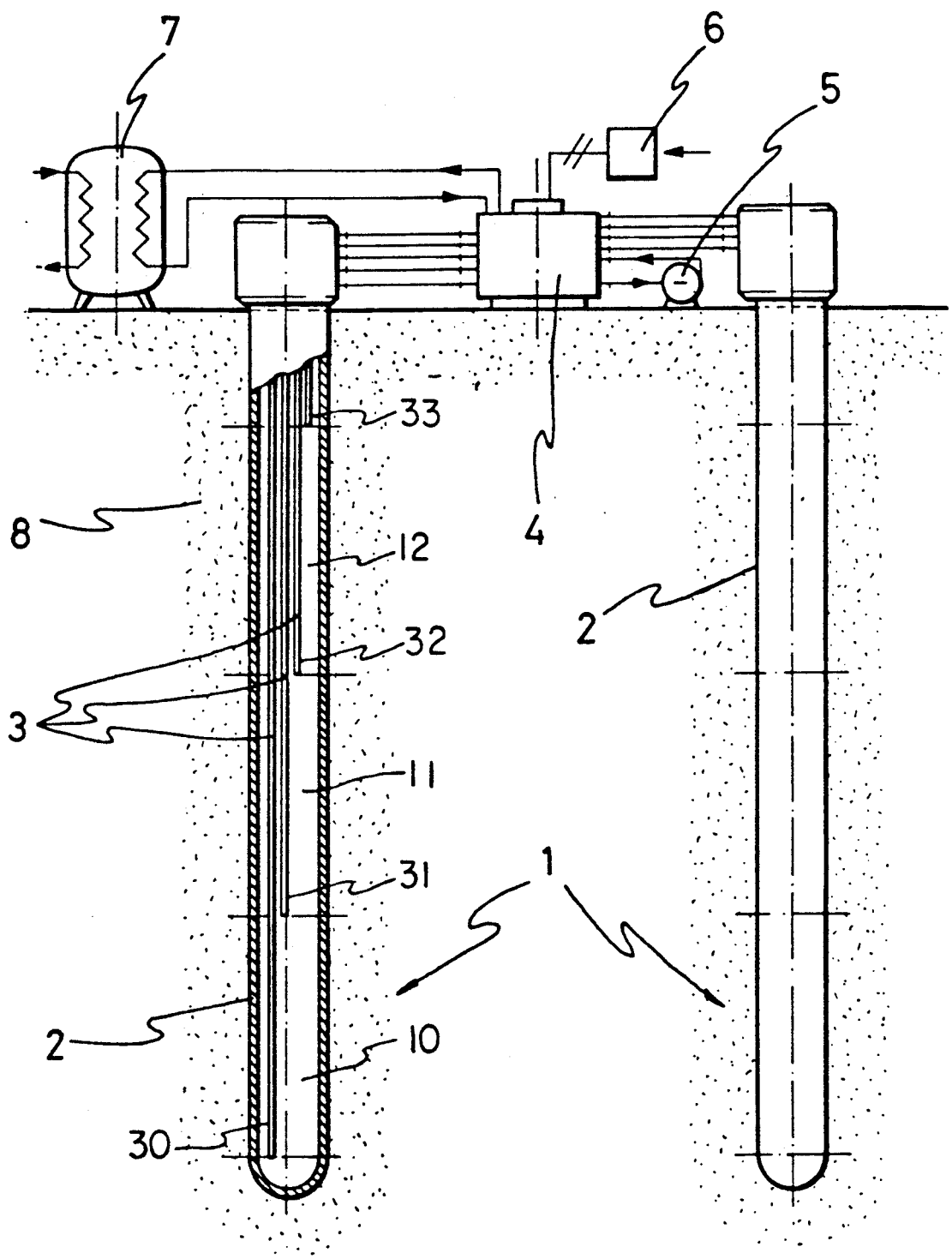

EXTRACTION SYSTEM OF GEOTHERMAL ENERGY

PURPOSE OF THE INVENTION

The present invention, as it is expressed in the title of the present specification, refers to a system for extraction of geothermal energy.

The system proposed in this invention utilises one or several heat exchangers in contact with hot rock of the geothermal deposit.

As rocks are considered as bad heat conductor materials, to obtain an adequate thermal flow suitable for industrial use, the practical exploitation of the above mentioned exchangers consists of establishing the heat in a limited exchanging zone and, in the meantime, the remaining zones will be recovering heat from the deposit, during the necessary time. After the heat extraction in the operating zone, for the appropriate time, the process is switched over to another zone by means of an appropriate switching device, leaving the exploitation zone as a recovery zone by means of the heat of the natural deposit.

The achieved advantages are the following:

The system works in a closed circuit and no strange fluids are injected in the deposit, thus avoiding environmental pollution.

This method permits the exploitation of deposits which is not possible by traditional means, based on the up-to-date technology, as in the case of dry rock deposits, big quantities of water injections are not necessary and not always available.

It allows high heat flows, through adapting the cycle times accordingly with the deposit temperature, the thermal fluid, the number of heat extraction zones, well depth, materials to be utilized, as well as the type of rock. In this way a continuous process is achieved.

BACKGROUND OF THE INVENTION

At present the geothermal deposits exploitation is based on the utilisation of hot fluids, steam or water coming from the same deposit, conveyed to the surface by drilled wells.

In the case of hot rock deposits, without natural water or steam, the usual procedure consists of drilling and fracturing rock by blasting or with hydraulic methods, then water is circulated towards a second well used as extractor of the hot steam produced.

Normally, very important quantities of external water are required by this system.

DESCRIPTION OF THE INVENTION

Each heat exchanger located in contact with the geothermal deposit hot rock, consists of a system of sounding pipes properly acting as heat exchangers between the rock and the inside circulating thermal fluid. In the interior of each sounding pipe there is one or more pipes of smaller diameter, or any other internal device for the conduction of the thermal fluid. These internal pipes may be coaxial, simply parallel to the main pipe or adopt any other arrangement, being installed in such a way that the internal end of each one is at a different level, permitting, in any case, to be connected by pairs, delimiting the zone of fluid circulation and thermal exchange in the main pipe.

The internal fluid conducting pipes are in sequential connection in time to get the operating times in the thermal transfer zones and regeneration times in the non-operating zones, in such a manner, that all zones pass in a cyclic way for both situations, permitting at time of the cyclic sequence, to get the maximum thermal flow for fixed temperatures in the rock and in the thermal fluid, as well as their flowing quantity.

The switching sequence in the pipes, as well as the operating times are achieved by means of an adequate control system. The switching system is achieved by individual valves or by means of multiple valves or another known similar device.

The system comprises a pump for thermal fluid pumping and circulation, accelerating the regeneration of non-working zones. It also comprises a heat exchanger and/or an accumulator vessel to keep the thermal energy extracted from the deposit.

To make the understanding of the characteristics of the invention easier and as an integral part of this specification, a drawing with a single FIGURE is included in the present specification with an explanatory and non-limiting nature, representing the following things:

BRIEF DESCRIPTION OF THE DRAWINGS

Single FIGURE. In a schematic way it shows the thermal energy extraction system according to the present invention.

DESCRIPTION OF THE PREFERRED EMBODIMENT

Referred to the indicated numbering in the above mentioned drawing it can be seen that the system of extraction of geothermal energy referred to the present invention, is suitable for exploitation of hot dry rock geothermal deposits or of any other kind of deposits, with direct heat transmission with the rock and operating with a fluid in a closed circuit.

The system utilises sounding pipes 1, constituted by pipes 2, for thermal exchange. Inside of these pipes the fluid conducting pipes 3 are installed. In this example of preferred embodiment, the internal pipes adopt a longitudinal arrangement with stepped lengths, in such a manner that by connecting two of them, the circulation is established as well as the thermal exchange in the main pipe.

For example, the combination of fluid-conducting pipes 32 and 33 forms thermal exchange zone 12, the combination of fluid-conducting pipes 31 and 32 forms thermal exchange zone 11 and the combination of fluid-conducting pipes 30 and 31 forms thermal exchange zone 10.

All the fluid conducting pipes 3 are connected to the same flow sequential distributor.

Reference no. 5 shows the circulating pump and reference no. 6 is the sequential control device.

The thermal fluid in the closed circuit is conveyed to the secondary exchanger and/or thermal accumulator 7.

The drawing shows two sounding pipes 1 in the drilled rock 8 or thermal deposit formation.

We claim:

1. An apparatus for extracting heat from a geothermal deposit using fluid circulation comprising:
   a closed sounding pipe for containing a fluid and extending from the surface of the geothermal deposit into the geothermal deposit;
   a plurality of fluid conducting pipes of different lengths extending within said sounding pipe, each pair of pipes of adjacent lengths defining a unique thermal exchange zone within said sounding pipe; and fluid distributor means external to said sounding pipe for causing fluid to flow through two of said fluid conducting pipes defining a working one of said thermal exchange zones whereby thermal transfer from the surrounding geothermal deposit to said fluid occurs in the working one of said thermal exchange zones while the other of said thermal exchange zones can regenerate their storage of heat from the surrounding geothermal deposit.

2. An apparatus according to claim 1 in which said plurality of fluid-conducting pipes are parallel to said sounding pipe.

3. An apparatus according to claim 1 in which said plurality of fluid-conducting pipes are arranged in a stepped sequence.

4. An apparatus according to claim 1 in which said fluid distributor means cyclically switches between each of said two of said plurality of fluid-conducting pipes of different lengths.

5. An apparatus according to claim 1 in which said fluid distributor means comprises a plurality of valves for sequentially causing the rein flow through pairs of said plurality of fluid-conducting pipes.

6. An apparatus according to claim 1 further comprising a heat exchanger for receiving the fluid after the fluid circulates in said sounding pipe and through said pair of fluid-conducting pipes.

* * * * *